(12) United States Patent
Takahashi et al.

(10) Patent No.: US 10,549,315 B2
(45) Date of Patent: Feb. 4, 2020

(54) ELECTRICAL STEEL SHEET

(71) Applicant: NIPPON STEEL & SUMITOMO METAL CORPORATION, Tokyo (JP)

(72) Inventors: Masaru Takahashi, Tokyo (JP); Shuichi Yamazaki, Tokyo (JP); Kazutoshi Takeda, Tokyo (JP); Hiroyasu Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 158 days.

(21) Appl. No.: 15/536,013

(22) PCT Filed: Dec. 21, 2015

(86) PCT No.: PCT/JP2015/085641
§ 371 (c)(1),
(2) Date: Jun. 14, 2017

(87) PCT Pub. No.: WO2016/104405
PCT Pub. Date: Jun. 30, 2016

(65) Prior Publication Data
US 2017/0341107 A1    Nov. 30, 2017

(30) Foreign Application Priority Data

Dec. 26, 2014  (JP) .................. 2014-266752

(51) Int. Cl.
*C23C 22/20* (2006.01)
*C23C 22/22* (2006.01)
(Continued)

(52) U.S. Cl.
CPC ................ *B05D 7/14* (2013.01); *B05D 1/28* (2013.01); *B05D 3/0254* (2013.01);
(Continued)

(58) Field of Classification Search
CPC ......... C23C 22/07; C23C 22/12; C23C 22/17; C23C 22/20; C23C 22/22
See application file for complete search history.

(56) References Cited

U.S. PATENT DOCUMENTS

| 3,856,568 A | 12/1974 | Tanaka et al. |
| 5,945,212 A | 8/1999 | Tanaka et al. |
| 2013/0209789 A1 | 8/2013 | Takeda et al. |

FOREIGN PATENT DOCUMENTS

| JP | 53-28375 B | 8/1978 |
| JP | 5-78855 A | 3/1993 |

(Continued)

OTHER PUBLICATIONS

Dixon, Greener Chelating Agents. 2012, In Handbook of Green Chemistry, P. T. Anastas (Ed.), pp. 293-295. (Year: 2012).*

(Continued)

*Primary Examiner* — Monique R Jackson
(74) *Attorney, Agent, or Firm* — Birch, Stewart, Kolasch & Birch, LLP

(57) ABSTRACT

An electrical steel sheet (1) includes a base material (2) of electrical steel, and an insulating film (3) formed on a surface of the base material (2), the insulating film (3) containing a polyvalent metal phosphate and Fe. A maximum value of a parameter Q expressed by "$Q=C_{Fe-O}/C_P$" is equal to or less than 1.3 times and equal to or more than 1.09 times an average value of the parameter Q in a region from a first depth from a surface of the insulating film to a second depth, $C_{Fe-O}$ denoting a proportion (atom %) of Fe bonded to O relative to all elements, and $C_P$ denoting a proportion (atom %) of P relative to all elements. The first depth is 20 nm from the surface, and the second depth is a depth where the proportion of P is equal to a proportion of metal Fe.

2 Claims, 7 Drawing Sheets

(51) Int. Cl.

| | | |
|---|---|---|
| *C23C 22/74* | (2006.01) | |
| *B05D 7/14* | (2006.01) | |
| *B05D 3/02* | (2006.01) | |
| *B05D 1/28* | (2006.01) | |
| *C21D 8/12* | (2006.01) | |
| *C04B 28/34* | (2006.01) | |
| *C23C 22/17* | (2006.01) | |
| *C04B 111/00* | (2006.01) | |

(52) U.S. Cl.
CPC .......... *C04B 28/344* (2013.01); *C21D 8/1283* (2013.01); *C23C 22/17* (2013.01); *C23C 22/20* (2013.01); *C23C 22/22* (2013.01); *C23C 22/74* (2013.01); *C04B 2111/00525* (2013.01)

(56) References Cited

FOREIGN PATENT DOCUMENTS

| JP | 6-330338 A | 11/1994 |
|---|---|---|
| JP | 11-131250 A | 5/1999 |
| JP | 11-152579 A | 6/1999 |
| JP | 2001-107261 A | 4/2001 |
| JP | 2002-47576 A | 2/2002 |
| JP | 2002-249881 A | 9/2002 |
| JP | 2002-317277 A | 10/2002 |
| JP | 2008-303411 A | 12/2008 |
| JP | 2009-155707 A | 7/2009 |
| JP | 2010-261063 A | 11/2010 |
| JP | 2013-249486 A | 12/2013 |
| WO | WO 2012/057168 A1 | 5/2012 |

OTHER PUBLICATIONS

International Preliminary Report on Patentability and English translation of the Written Opinion of the International Searching Authority (Forms PCT/IB/338, PCT/IB/373 and PCT/ISA/237), dated Jul. 6, 2017, for International Application No. PCT/JP2015/085641.

International Search Report for PCT/JP2015/085641 (PCT/ISA/210) dated Mar. 22, 2016.

Written Opinion of the International Searching Authority for PCT/JP2015/085641 (PCT/ISA/237) dated Mar. 22, 2016.

* cited by examiner

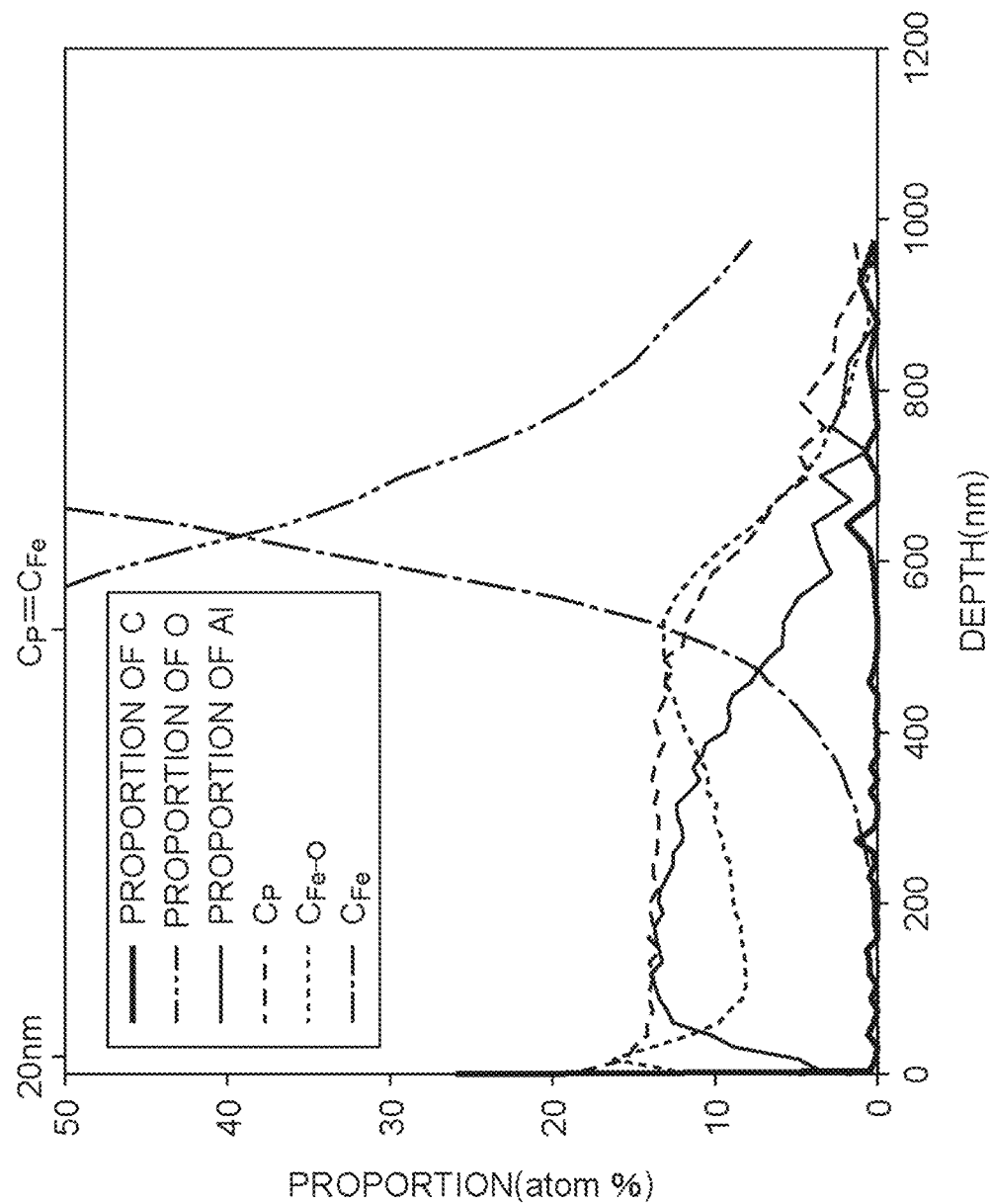

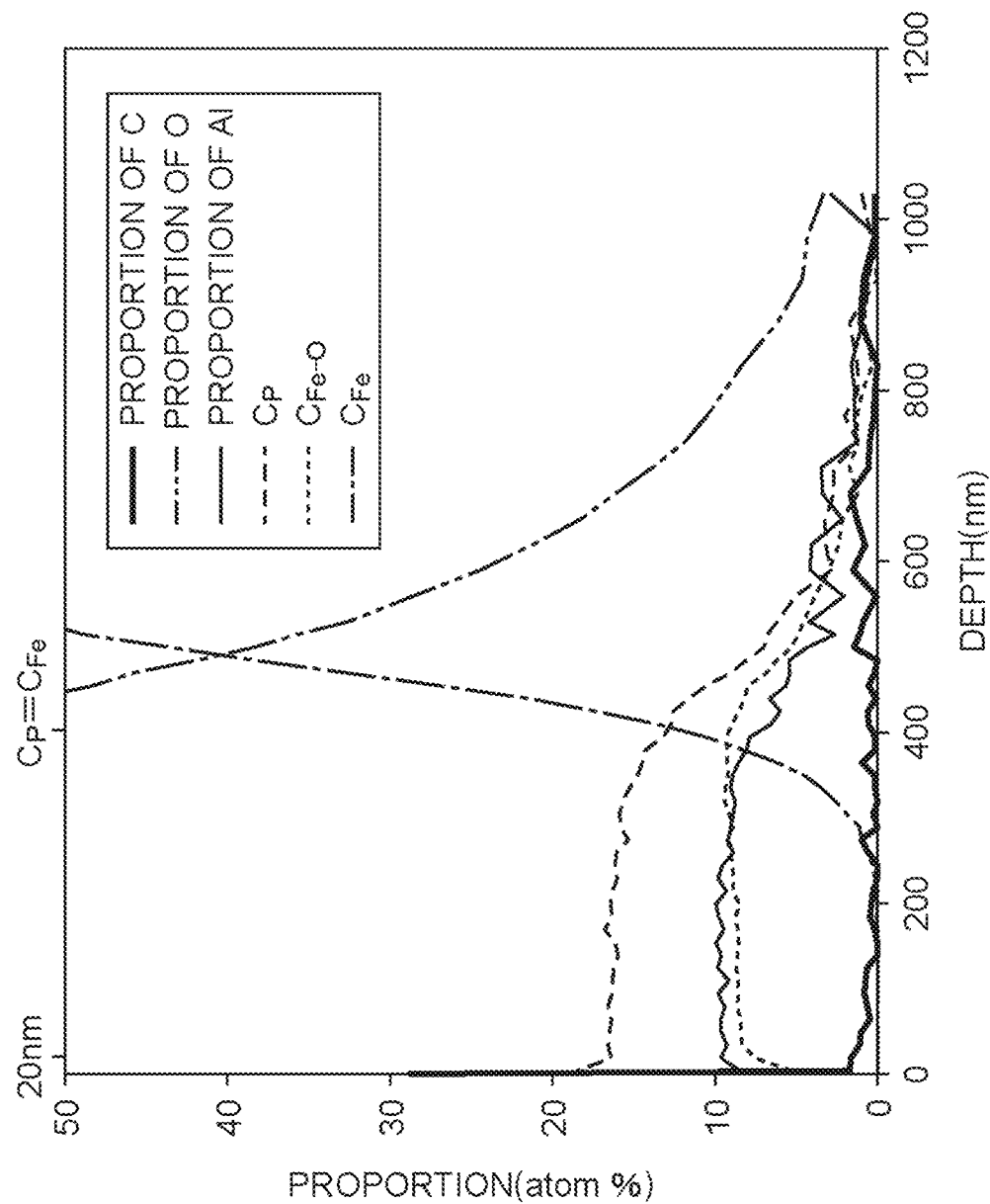

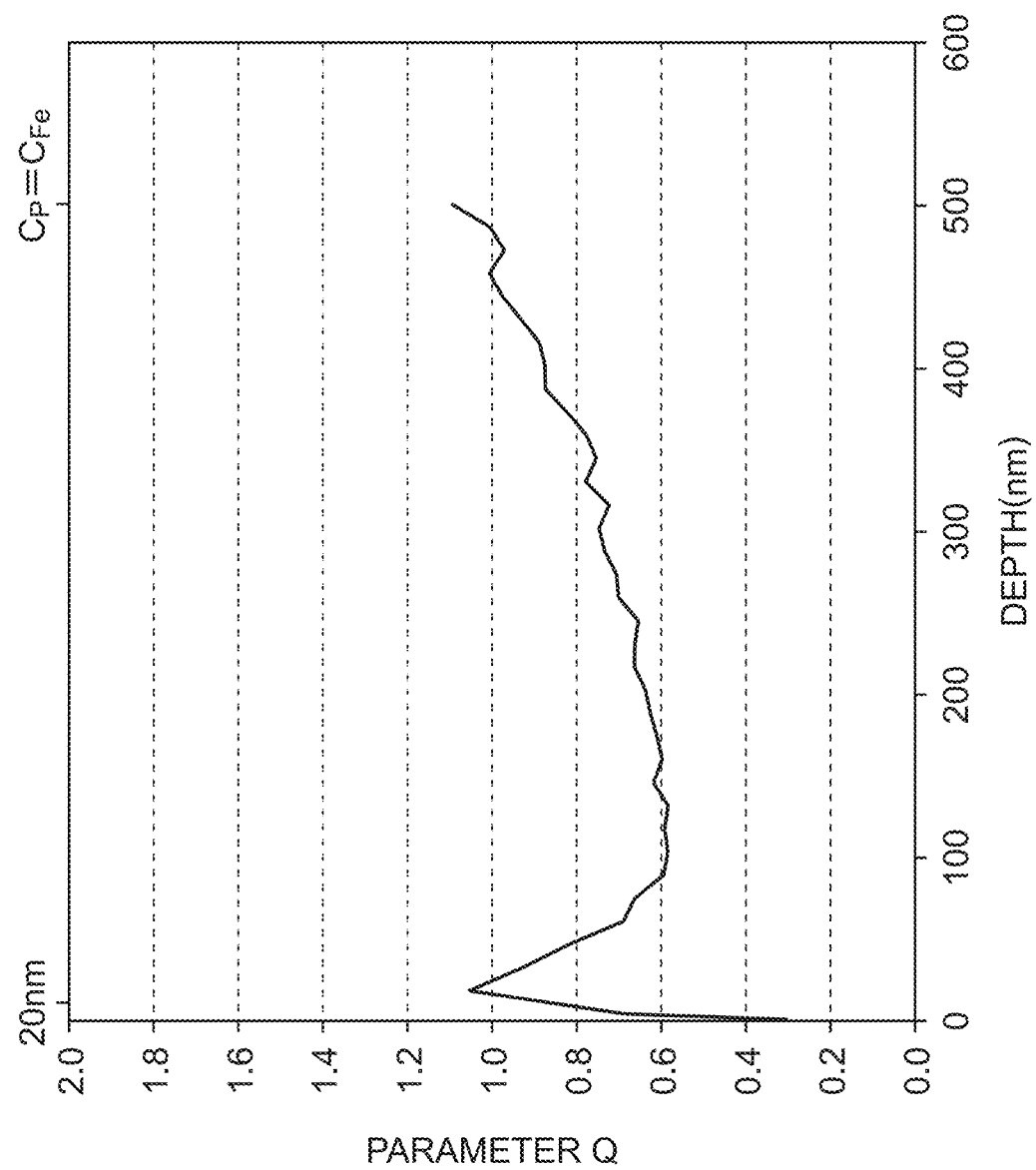

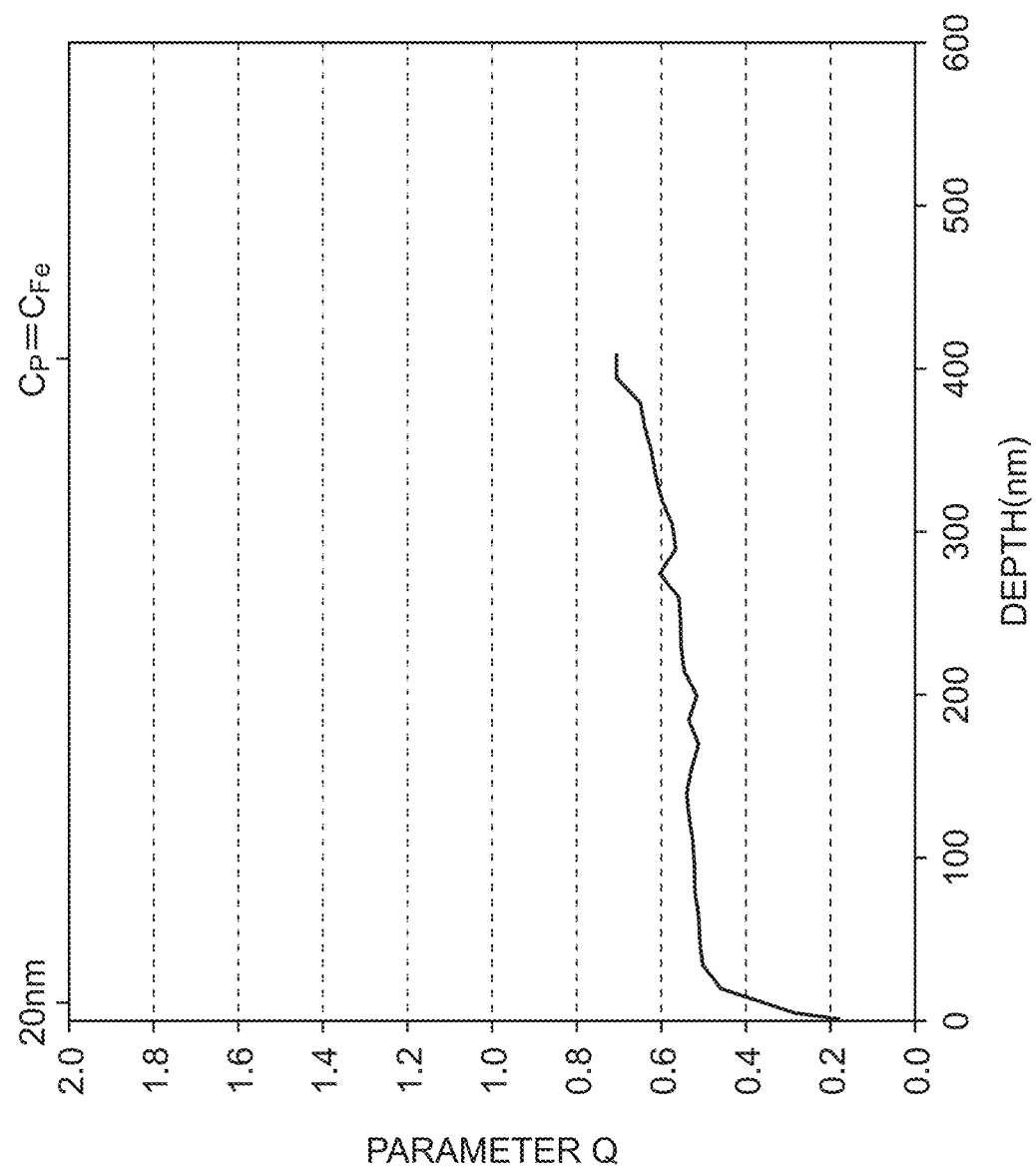

1.0%

0.3%

0.1%

0.03%

0.01%

ELECTRICAL STEEL SHEET

TECHNICAL FIELD

The present invention relates to an electrical steel sheet.

BACKGROUND ART

An electrical steel sheet is used or transported under a corrosive environment. For example, the electrical steel sheet is used in hot and humid regions or transported by sea. During the transportation by sea, a large amount of salt comes flying. Therefore, the electrical steel sheet is required to have rust resistance. To obtain the rust resistance, an insulating film is formed on the surface of the electrical steel sheet. An example of the insulating film is a chromite-based insulating film. Though the chromite-based insulating film exhibits good rust resistance, hexavalent chromium used as the raw material of the chromite-based insulating film is carcinogenic. Therefore, it is required to develop an insulating film that can be formed without using hexavalent chromium as a raw material.

Examples of the insulating film that can be formed without using hexavalent chromium as a raw material include a phosphate-based insulating film, a silica-based insulating film, and a zirconium-based insulating film (PATENT LITERATURES 1 to 12). However, with these insulating films, the rust resistance at the same level as that of the chromite-based insulating film cannot be obtained. Though the rust resistance is improved by thickening the insulating film, the weldability and the caulking property decrease more with a thicker insulating film.

CITATION LIST

Patent Literature

Patent Literature 1: Japanese Examined Patent Application Publication No. 53-028375

Patent Literature 2: Japanese Laid-open Patent Publication No. 05-078855

Patent Literature 3: Japanese Laid-open Patent Publication No. 06-330338

Patent Literature 4: Japanese Laid-open Patent Publication No. 11-131250

Patent Literature 5: Japanese Laid-open Patent Publication No. 11-152579

Patent Literature 6: Japanese Laid-open Patent Publication No. 2001-107261

Patent Literature 7: Japanese Laid-open Patent Publication No. 2002-047576

Patent Literature 8: International Publication Pamphlet No. 2012/057168

Patent Literature 9: Japanese Laid-open Patent Publication No. 2002-47576

Patent Literature 10: Japanese Laid-open Patent Publication No. 2008-303411

Patent Literature 11: Japanese Laid-open Patent Publication No. 2002-249881

Patent Literature 12: Japanese Laid-open Patent Publication No. 2002-317277

SUMMARY OF INVENTION

Technical Problem

An object of the present invention is to provide an electrical steel sheet capable of obtaining good rust resistance without using hexavalent chromium as a raw material of an insulating film.

Solution to Problem

The present inventors earnestly studied to solve the above problem. As a result, it has been revealed that good rust resistance is obtained when the relation between the proportion of P and the proportion of Fe bonded to O contained in the insulating film is specific. It has also been revealed that use of a coating solution containing a chelating agent is important for forming the insulating film.

The present inventors have reached the aspects of the present invention described below as a result of further earnest studies based on the above findings.

(1)

An electrical steel sheet, including:

a base material of electrical steel; and an insulating film formed on a surface of the base material, the insulating film containing a polyvalent metal phosphate and Fe, wherein a maximum value of a parameter Q expressed by "$Q=C_{Fe-O}/C_P$" is equal to or less than 1.3 times an average value of the parameter Q in a region from a first depth from a surface of the insulating film to a second depth, $C_{Fe-O}$ denoting a proportion (atom %) of Fe bonded to O relative to all elements, and $C_P$ denoting a proportion (atom %) of P relative to all elements, wherein the first depth is 20 nm from the surface, and wherein the second depth is a depth where the proportion of P is equal to a proportion of metal Fe.

(2)

The electrical steel sheet according to (1), wherein the average value of the parameter Q is 0.4 to 0.8.

(3)

The electrical steel sheet according to (1) or (2), wherein the insulating film contains an organic resin.

Advantageous Effects of Invention

According to the present invention, good rust resistance can be obtained without using hexavalent chromium as the raw material of the insulating film because the relation between the proportion of P and the proportion of Fe bonded to O contained in the insulating film is specific. This can avoid a decrease in weldability and caulking property accompanying an increase in thickness of the insulating film.

BRIEF DESCRIPTION OF DRAWINGS

FIG. 2A is a view illustrating an XPS analysis result of an insulating film formed using a coating solution not containing a chelating agent;

FIG. 2B is a view illustrating an XPS analysis result of an insulating film formed using a coating solution containing a chelating agent;

FIG. 3A is a view illustrating a distribution of a parameter Q of an insulating film formed using the coating solution not containing the chelating agent;

FIG. 3B is a view illustrating a distribution of a parameter Q of an insulating film formed using the coating solution containing the chelating agent;

DESCRIPTION OF EMBODIMENT

Figure 1:
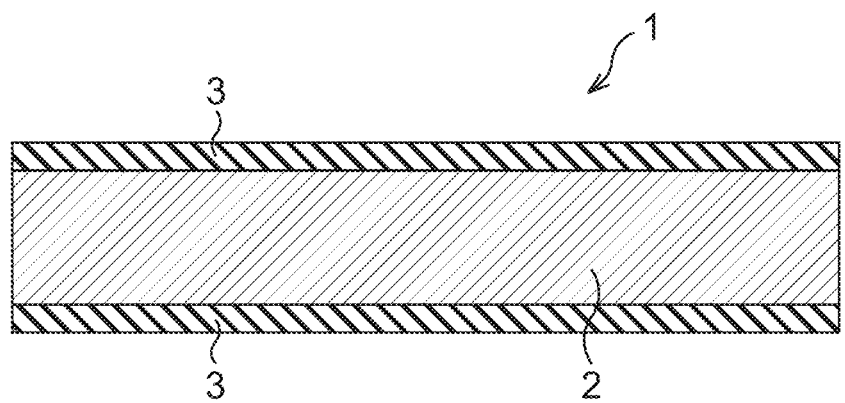
FIG. 1 is a cross-sectional view illustrating a structure of an electrical steel sheet according to an embodiment of the present invention.

Hereinafter, an embodiment of the present invention will be described in detail referring to the accompanying drawings. FIG. 1 is a cross-sectional view illustrating a structure of an electrical steel sheet according to the embodiment of the present invention.

As illustrated in FIG. 1, an electrical steel sheet 1 according to the embodiment of the present invention includes a base material 2 of electrical steel and an insulating film 3 formed on a surface of the base material 2, the insulating film 3 containing a polyvalent metal phosphate and Fe. The base material 2 includes a composition suitable for a grain-oriented electrical steel sheet or a non-oriented electrical steel sheet. The polyvalent metal phosphate includes, for example, Al, Zn, Mg or Ca or any combination thereof. Hereinafter, M sometimes denotes Al, Zn, Mg or Ca or any combination thereof.

A maximum value of a parameter Q expressed by "$Q = C_{Fe-O}/C_P$" is equal to or less than 1.3 times an average value of the parameter Q in a region from a first depth from a surface of the insulating film to a second depth, and the average value is preferably 0.4 to 0.8. $C_{Fe-O}$ denotes a proportion (atom %) of Fe bonded to O relative to all elements, and $C_P$ denotes a proportion (atom %) of P relative to all elements. The first depth is 20 nm from the surface of the insulating film 3, and the second depth is a depth where the proportion of P is equal to a proportion of metal Fe.

Though details will be described later, the parameter Q is an index reflecting the denseness and the uniformity of the composition of the insulating film, and the insulating film 3 satisfying the above relation is denser and more uniform than an insulating film included in a conventional electrical steel sheet. The insulating film 3 being dense and uniform in composition suppresses permeation of salt and moisture causing corrosion and therefore has good rust resistance. Therefore, according to the electrical steel sheet 1, good rust resistance can be obtained without decreasing the weldability and the caulking property without using hexavalent chromium as the raw material of the insulating film 3.

Next, a method of manufacturing the electrical steel sheet 1 will be described. This method includes applying a coating solution composed of an M-containing polyvalent metal phosphate, a chelating agent and water to the base material of the electrical steel, and baking the coating solution. Hereinafter, M sometimes denotes Al, Zn, Mg or Ca or any combination thereof. Water with a total concentration of Ca ions and Mg ions of 100 ppm or less is used as the water in the coating solution. Examples of the polyvalent metal phosphate include an aluminum monophosphate, a zinc monophosphate, a magnesium monophosphate, and a calcium monophosphate. Hereinafter, an aluminum phosphate, a zinc phosphate, a magnesium phosphate, and a calcium phosphate represent the aluminum monophosphate, the zinc monophosphate, the magnesium monophosphate, and the calcium monophosphate respectively.

In baking the coating solution, the ends of the phosphate are crosslinked by the dehydration/condensation reaction to form an insulating film. Examples of the reaction formula of the dehydration/condensation reaction include the followings. The chelating agent is described as "HO—R—OH" and the metal is described as "M".

(Reaction formula 1)

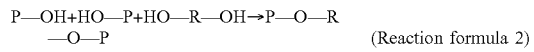
(Reaction formula 2)

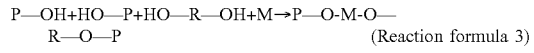
(Reaction formula 3)

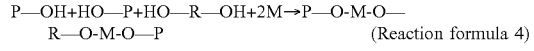
(Reaction formula 4)

On the other hand, when a coating solution composed of the polyvalent metal phosphate and water but not containing the chelating agent is used, the reaction of Reaction formula 1 occurs but the reactions of Reaction formula 2 to Reaction formula 4 do not occur. Therefore, in the case of using the coating solution containing the chelating agent, much more crosslinking points exist in the insulating film and higher rust resistance can be obtained than in the case of using the coating solution not containing chelating agent. With more bonds of the chelating agent, a larger number of crosslinking points exist and higher rust resistance can be obtained.

As the chelating agent, for example, an oxycarbonic acid-based, dicarboxylic acid-based or phosphonic acid-based chelating agent is used. Examples of the oxycarbonic acid-based chelating agent include a malic acid, a glycolic acid and a lactic acid. Examples of the dicarboxylic acid-based chelating agent include an oxalic acid, a malonic acid and a succinic acid. Examples of the phosphonic acid-based chelating agent include an aminotrimethylene phosphonic acid, a hydroxyethylidene monophosphonic acid, and a hydroxyethylidene diphosphonic acid.

The amount of the chelating agent contained in the coating solution is 1 mass % to 30 mass % relative to the mass of the insulating film after baking. Since the coating solution containing phosphate is acidic, Fe elutes from the base material into the coating solution while the drying of the coating solution is not completed and the coating solution is kept acidic. When Fe elutes excessively to exceed the reaction limit of the chelating agent, an iron phosphate and an iron hydroxide are generated, so that the insulating film having the parameter Q satisfying the above condition cannot be obtained. This phenomenon is remarkable when the amount of the chelating agent is less than 1 mass %. Accordingly, the amount of the chelating agent is 1 mass % or more relative to the mass of the insulating film after baking. On the other hand, when the amount of the chelating agent is more than 30 mass %, the phosphate in the coating solution is less than 70 mass %, so that sufficient heat resistance cannot be obtained in the insulating film. Accordingly, the amount of the chelating agent is 30 mass % or less relative to the mass of the insulating film after baking.

The chelating agent is an active compound but, once reacted with metal, becomes stable in terms of energy and does not exhibit sufficient activity any longer. Accordingly, to keep the activity of the chelating agent high, metal other than the metal contained in the phosphate is prevented from reacting with the chelating agent before the baking of the coating solution is completed. Therefore, it is preferable that the concentration of metal ions having high reactivity with the chelating agent in water is low. Examples of the metal ion include a Ca ion and a Mg ion. When the total concentration of the Ca ions and the Mg ions is more than 100 ppm, the activity of the chelating agent decreases.
Therefore, the total concentration of the Ca ions and the Mg ions is 100 ppm or less, and more preferably 70 ppm or less. A smaller amount of alkaline-earth metal ions other than the Ca ions and the Mg ions is more preferable.

The chelating agent contains a hydroxyl group at an end, and is likely to take an association state (hydrogen bond) expressed by Reaction formula 5.

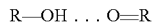  (Reaction formula 5)

When the degree of association (degree of hydrogen bond) of the hydroxyl group in the chelating agent increases, the crosslinking reactions expressed by Reaction formula 2 to Reaction formula 4 hardly occur. Therefore, the application of the coating solution is preferably performed to make the degree of association as low as possible. For example, in the case of performing application using a roller (roll coating), it is preferable to apply the coating solution while giving a shear stress to the coating solution to decrease the degree of association of the chelating agent. Decreasing the diameter of the roller and increasing the moving speed of the base material can give the shear stress suitable for releasing the association state. For example, it is preferable to use a roller having a diameter of 700 mm or less and set the moving speed of the base material to 60 m/min or more, and more preferable to use a roller having a diameter of 500 mm or less and set the moving speed of the base material to 70 m/min or more.

The baking of the coating solution is performed at a temperature of 250° C. or higher, the heating rate (first heating rate) from the temperature of the base material at the application, for example, the room temperature of about 30° C., to 100° C. is 8° C./sec or more, and the heating rate (second heating rate) from 150° C. to 250° C. is lower than the first heating rate. The temperature at the application is substantially equal to the temperature of the coating solution.

The progress of the above-described association of the chelating agent occurs no longer if the flowability of the coating solution is lost. Accordingly, to make the degree of association as low as possible, it is preferable to increase the first heating rate up to the boiling point of water (100° C.). When the first heating rate is less than 8° C./sec, the degree of association of the chelating agent rapidly increases during temperature increase to make the crosslinking reactions expressed by Reaction formula 2 to Reaction formula 4 hardly occur. Therefore, the first heating rate is 8° C./sec or more.

The crosslinking reactions of the phosphate and the chelating agent and the decomposition and volatilization of the chelating agent of Reaction formula 1 to Reaction formula 4 occur in a temperature range of 150° C. to 250° C. Therefore, by decreasing the second heating rate from 150° C. to 250° C., it is possible to accelerate the crosslinking reactions while suppressing the decomposition of the chelating agent. However, the decreasing the heating rate may cause a decrease in productivity. On the one hand, the crosslinking reaction of the chelating agent varies depending on the above-described degree of association of the chelating agent. Therefore, when the first heating rate is high and the degree of association of the chelating agent is low, the crosslinking reaction of the phosphate and the chelating agent can be accelerated even if the second heating rate is increased. On the other hand, when the first heating rate is low and the degree of association of the chelating agent is high, the crosslinking reaction of the chelating agent and the phosphate cannot sufficiently proceed unless the second heating rate is accordingly decreased. From the study by the present inventors, it has been revealed that when the first heating rate is 8° C./sec or more and the second heating rate is lower than the first heating rate, the crosslinking reaction of the phosphate and the chelating agent proceeds according to the degree of association of the chelating agent and good rust resistance can be obtained. However, when the second heating rate is excessively high, for example, more than 18° C./sec, the crosslinking is not sufficiently completed, so that good rust resistance cannot be obtained even if the first heating rate is 8° C./sec or more. Accordingly, the second heating rate is 18° C./sec or less. On the other hand, with a lower second heating rate, the productivity becomes lower, which is remarkable at less than 5° C./sec. Accordingly, the second heating rate is preferably 5° C./sec or more.

The electrical steel sheet 1 can be manufactured through the application of the coating solution to the base material of the electrical steel and baking of the coating solution.

The coating solution may contain an organic resin. The organic resin contained in the coating solution has an action of suppressing abrasion of a punching die. Therefore, use of the coating solution containing the organic resin improves the punching workability of the electrical steel sheet. The organic resin is preferably used as a water-dispersible organic emulsion. In the case where the water-dispersible organic emulsion is used, it is more preferable that less alkaline-earth metal ions such as Ca ions, Mg ions are contained therein. Examples of the organic resin include an acrylic resin, an acrylic styrene resin, an alkyd resin, a polyester resin, a silicone resin, a fluorocarbon resin, a polyolefin resin, a styrene resin, a vinyl acetate resin, an epoxy resin, a phenol resin, an urethane resin, and a melamine resin.

Next, the action of the chelating agent will be described.

To reveal the action of the chelating agent, the present inventors performed analysis by the X-ray photoelectron spectroscopy (XPS) on the insulating film formed using the coating solution containing the chelating agent and the insulating film formed using the coating solution not containing the chelating agent. The aluminum phosphate was used as the polyvalent metal phosphate contained in the coating solution. In the analysis, Quantera SXM manufactured by ULVAC-PHI, Inc. was used as an analyzer and mono AlKα ray (hv=1486.6 eV) was used as an X-ray source. A region to a depth of about 1000 nm from the surface of the insulating film was specified as a measuring object, the insulating film was etched by the sputtering method using argon ions, and the proportions (atom %) of various elements relative to all elements in a circular region having a diameter of 200 μm were measured every time the etching proceeded by about 15 nm. The etching speed was 4.6 nm/min.

The elements being the measuring objects were carbon (C), oxygen (O), aluminum (Al), phosphorus (P) and iron (Fe). The proportions of the elements were measured using X-ray photoelectron absorption spectra peculiar to the elements. Fe contains Fe bonded to O and metal Fe, and only Fe bonded to O is captured in a crosslinked structure of the insulating film. As for Fe, the proportion of Fe bonded to O and the proportion of metal Fe were distinguished as follows. In the X-ray photoelectron absorption spectra attributing to a $2p_{3/2}$ orbit of Fe, the X-ray photoelectron absorption spectrum derived from metal Fe exhibits a peak top in bond energy near 707 eV, and the X-ray photoelectron absorption spectrum derived from Fe bonded to O exhibits a peak top in bond energy near 711 eV. Fitting was performed by a Lorenz function utilizing the above distinction to the absorption spectrum having the peak top near 707 eV and the absorption spectrum having the peak top near 711 eV, and the proportion of metal Fe and the proportion of Fe bonded to O were calculated using the proportions of the respective absorptive areas. FIG. 2A illustrates an XPS analysis result of the insulating film formed using the coating solution not containing the chelating agent, and FIG. 2B illustrates an XPS analysis result of the insulating film formed using the coating solution containing the chelating agent.

As illustrated in FIG. 2A and FIG. 2B, the distribution of the proportion ($C_{Fe-O}$) of Fe bonded to O relative to all elements and the proportion ($C_P$) of P relative to all elements were different depending on the presence or absence of the chelating agent. The present inventors obtained the ratio of the proportion $C_{Fe-O}$ to the proportion $C_P$ (parameter Q). FIG. 3A illustrates a distribution of the parameter Q of the insulating film formed using the coating solution not containing the chelating agent, and FIG. 3B illustrates a distribution of the parameter Q of the insulating film formed using the coating solution containing the chelating agent. A portion down to a depth of 20 nm from the surface of the insulating film is likely to be affected by the factor outside the insulating film. A depth where the proportion $C_P$ is equal to the proportion ($C_{Fe}$) of metal Fe is substantially the depth of the interface between the insulating film and the base material of electrical steel. Therefore, a region from the depth of 20 nm from the surface of the insulating film to the depth where the proportion $C_P$ is equal to the proportion $CF_e$ is important for evaluation of the insulating film.

As illustrated in FIG. 3A, in the insulating film formed using the coating solution not containing the chelating agent, the parameter Q, with the depth of 20 nm from the surface of the insulating film as a reference, once decreased toward the interface between the insulating film and the base material and then increased. Further, there was a large difference between the minimum value (about 0.6) and the maximum value (about 1.1) of the parameter O. On the other hand, as illustrated in FIG. 3B, in the insulating film formed using the coating solution containing the chelating agent, the parameter Q, with the depth of 20 nm from the surface of the insulating film as a reference, gradually increased toward the interface between the insulating film and the base material. Further, the difference between the minimum value (about 0.5) and the maximum value (about 0.7) of the parameter Q was small, and the parameter Q was small in whole.

With a higher proportion of bonding between the phosphate and Fe, the parameter Q is larger. The bonding between the phosphate and Fe is formed not so dense as the direct bonding between the phosphate and the chelating agent. Accordingly, with a larger the parameter Q, the denseness of the insulating film is lower. Further, the fluctuation in the parameter Q reflects fluctuation in composition of the insulating film. Accordingly, with a larger difference between the maximum value and the minimum value of the parameter Q, the uniformity of the composition of the insulating film is lower. From the above, in the insulating film formed using the coating solution containing the chelating agent, the crosslinking reaction sufficiently proceeds more than in the insulating film formed using the coating solution not containing the chelating agent, and a dense and uniform crosslinked state (film structure) is formed and corrosion resistance including good rust resistance can be obtained.

The present inventors focused on the result obtained by the XPS analysis and considered that the distribution of the proportion $C_{Fe-O}$ and the distribution of the proportion $C_P$ greatly contributes to the improvement in rust resistance of the insulating film, and investigated in detail the relationship between the parameter Q and the rust resistance.

Here, a method of evaluating the rust resistance will be described.

Examples of the test of evaluating the rust resistance of the electrical steel sheet include the humidity cabinet test defined in JIS K 2246 and the salt spray test defined in JIS Z 2371. However, since the corrosive environments in these tests are greatly different from the corrosive environment where the electrical steel sheet rusts, the rust resistance of the electrical steel sheet cannot be appropriately evaluated by these tests.

Hence, the present inventors studied the method capable of appropriately evaluating the rust resistance in the corrosive environment where the electrical steel sheet rusts. As a result, it has been found that the following method can appropriately evaluate the rust resistance. In this method, liquid droplets of sodium chloride solutions different in concentration are attached by 0.5 μl to the surface of the electrical steel sheet having the insulating film and dried, and the electrical steel sheet is held in an atmosphere with constant temperature and humidity of a temperature of 50° C. and a relative humidity RH of 90% for 48 hours. A thermo-hygrostat may be used. Thereafter, the presence or absence of rust is observed, and the concentration of the sodium chloride solution with which the electrical steel sheet does not rust is identified. The rust resistance is evaluated based on the concentration of the sodium chloride solution with which the rust does not form.

More specifically, in this method, after the attachment and drying of the liquid droplets of the sodium chloride solutions, the electrical steel sheet is exposed to a moist atmosphere. Such process is similar to a corrosive environment to which the electrical steel sheet is exposed. In the corrosive environment, salt adheres to the surface of the electrical steel sheet during storage, transportation and use and then the salt deliquesces due to an increase in humidity. With a higher concentration of the sodium chloride solution, a larger amount of sodium chloride remains after drying and the rust is more likely to form. Accordingly, by making an observation while decreasing stepwise the concentration of the sodium chloride solution, and specifying the concentration where the rust does not form (hereinafter, sometimes referred to as a "limit sodium chloride concentration"), the rust resistance in the corrosive environment to which the electrical steel sheet is actually exposed can be quantitatively evaluated based on the limit sodium chloride concentration.

Figure 4A:
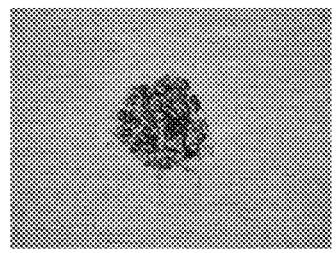
FIG. 4A is a view illustrating an example of a test result of rust resistance when a concentration of sodium chloride was 1.0 mass %.
Figure 4B:
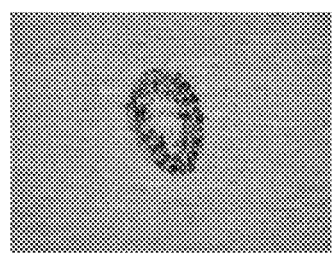
FIG. 4B is a view illustrating an example of a test result of rust resistance when a concentration of sodium chloride was 0.3 mass %.
Figure 4C:
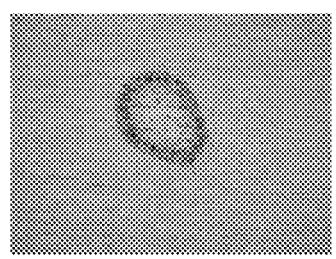
FIG. 4C is a view illustrating an example of a test result of rust resistance when a concentration of sodium chloride was 0.1 mass %.
Figure 4D:
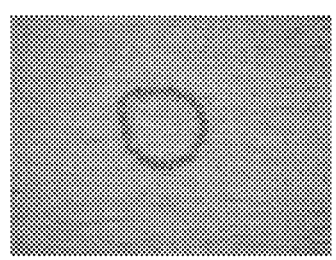
FIG. 4D is a view illustrating an example of a test result of rust resistance when a concentration of sodium chloride was 0.03 mass %.
Figure 4E:
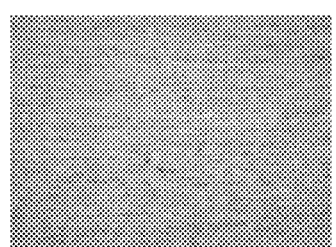
FIG. 4E is a view illustrating an example of a test result of rust resistance when a concentration of sodium chloride was 0.01 mass %.

FIG. 4A to FIG. 4E illustrate examples of the test result by the above method. In this test, the concentration of sodium chloride was 1.0 mass % (FIG. 4A), 0.3 mass % (FIG. 4B), 0.1 mass % (FIG. 4C), 0.03 mass % (FIG. 4D), or 0.01 mass % (FIG. 4E). As illustrated in FIG. 4A to FIG. 4E, rust was observed when the concentration of the sodium chloride was 1 mass %, 0.3 mass %, 0.1 mass %, or 0.03 mass %, and rust was not observed when the concentration of the sodium chloride was 0.01 mass %. Therefore, the limit sodium chloride concentration of the electrical steel sheet is 0.01 mass %. The present inventors have confirmed that the rusting state rarely changes even when the hold time in the atmosphere with constant temperature and humidity is over 48 hours.

Figure 5A:
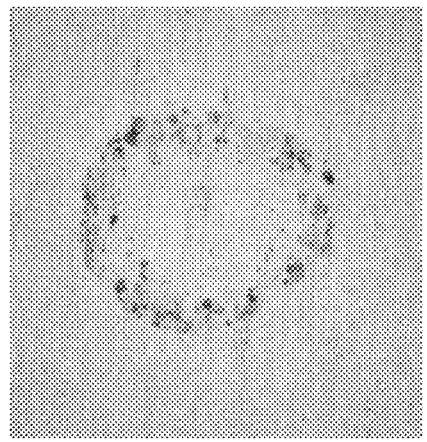
FIG. 5A is a view illustrating an example of a test result of rust resistance when an insulating film was formed using a coating solution not containing a chelating agent.
Figure 5B:
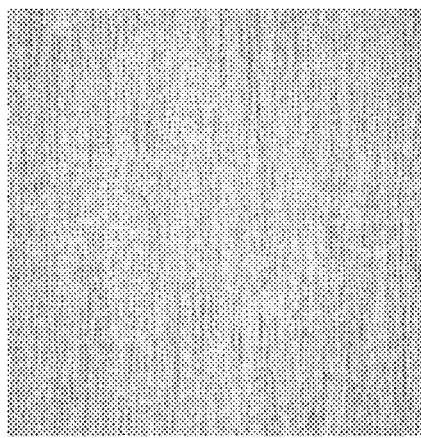
FIG. 5B is a view illustrating an example of a test result of rust resistance when an insulating film was formed using a coating solution containing a chelating agent.

FIG. 5A illustrates an example of a test result by the above method about the electrical steel sheet having the insulating film formed using the coating solution not containing the chelating agent, and FIG. 5B illustrates an example of a test result by the above method about the electrical steel sheet having the insulating film formed using the coating solution containing the chelating agent. Each of the coating solutions contains the aluminum phosphate as the polyvalent metal phosphate. On the electrical steel sheet having the insulating film formed using the coating solution not containing the chelating agent, rust was observed in the case of using the sodium chloride solution having a concentration of 0.03 mass % as illustrated in FIG. 5A. On the other hand, on the electrical steel sheet having the insulating film formed using the coating solution containing the chelating agent, no rust was observed even in the case of using the sodium chloride solution having a concentration of 0.2 mass % as illustrated in FIG. 5B.

As described above, the limit sodium chloride concentration is higher and better rust resistance can be obtained in the case of forming the insulating film using the coating solution containing the chelating agent than in the case of forming the insulating film using the coating solution not containing the chelating agent.

From the above, the chelating agent affects the distribution of the parameter Q, and it is important to make a specific distribution of the parameter Q in order to obtain good rust resistance. In the electrical steel sheet 1 according to the embodiment of the present invention, in the region from the first depth from the surface of the insulating film 3 (a depth of 20 nm from the surface of the insulating film 3) to the second depth (a depth where the proportion of P is equal to the proportion of metal Fe), the maximum value of the parameter Q is equal to or less than 1.3 times the average value, and the average value of the parameter Q is preferably 0.4 to 0.8. Therefore, according to the electrical steel sheet 1, good rust resistance can be obtained.

When the maximum value of the parameter Q is more than 1.3 times the average value, crystallization of the iron phosphate is partially generated to form an interface between a crystallized portion and a not-crystallized portion, thereby making corrosion factors easy to permeate through the insulating film, so that sufficient denseness and uniformity cannot be obtained, resulting in decreased corrosion resistance. Therefore, the maximum value of the parameter Q is equal to or less than 1.3 times the average value. The maximum value of the parameter Q is preferably equal to or less than 1.2 times the average value.

When the average value of the parameter Q is less than 0.4, adhesiveness between the insulating film and the base material is sometimes low. Therefore, the average value of the parameter Q is preferably 0.4 or more, and more preferably 0.5 or more. On the other hand, when the average value of the parameter Q is more than 0.8, variation in the composition of the insulating film is large, so that good rust resistance cannot be obtained in some cases. Therefore, the average value of the parameter Q is preferably 0.8 or less, and more preferably 0.7 or less.

Good rust resistance can be obtained without using hexavalent chromium as the raw material of the insulating film 3 by the electrical steel sheet 1 according to the embodiment. For example, the electrical steel sheet 1 exhibits sufficient rust resistance even under a high airborne salt environment during transportation by sea or the like or under a hot and humid environment corresponding to the subtropical zone or the tropical zone. Since the insulating film 3 does not need to be formed thick, a decrease in weldability and caulking property can be avoided.

It should be noted that the above embodiment merely illustrate concrete examples of implementing the present invention, and the technical scope of the present invention is not to be construed in a restrictive manner by the embodiment. That is, the present invention may be implemented in various forms without departing from the technical spirit or main features thereof.

EXAMPLES

Next, examples of the present invention will be described. The condition in examples is one condition example employed for confirming the feasibility and the effect of the present invention, and the present invention is not limited to the one condition example. The present invention can employ various conditions without departing from the scope of the present invention and within achieving the object of the present invention.

The present inventors prepared coating solutions each composed of phosphate, a chelating agent, an organic resin and water listed in Table 1 and applied to both surfaces of a base material of electrical steel and baked. The total concentration (total ion concentration) of Ca ions and Mg ions contained in the water is also listed in Table 1. The application condition and the baking condition are also listed in Table 1. The first heating rate is the heating rate from 30° C. to 100° C., and the second heating rate is the heating rate from 150° C. to 250° C. The base material contained 0.3 mass % of Si, and the thickness of the base material was 0.5 mm. In Sample No. 23, an insulating film was formed using chromate in place of phosphate.

TABLE 1

| | COATING SOLUTION | | | | |
| --- | --- | --- | --- | --- | --- |
| SAMPLE No. | PHOSPHATE | ORGANIC RESIN | CHELATING AGENT | OTHER MATERIAL | TOTAL ION CONCENTRATION (ppm) |
| 1 | ALUMINUM PHOSPHATE | N/A | N/A | N/A | 200 |
| 2 | ALUMINUM PHOSPHATE | ACRYLIC | N/A | N/A | 50 |

TABLE 1-continued

| | | | | | |
|---|---|---|---|---|---|
| 3 | ALUMINUM PHOSPHATE | ACRYLIC | N/A | N/A | 50 |
| A | ALUMINUM PHOSPHATE | ACRYLIC AND *1 | N/A | N/A | 50 |
| 5 | ALUMINUM PHOSPHATE | ACRYLIC | GLUCONIC ACID | N/A | 200 |
| 6 | ALUMINUM PHOSPHATE | ACRYLIC | GLUCONIC ACID | N/A | 100 |
| 7 | ALUMINUM PHOSPHATE | ACRYLIC | GLUCONIC ACID | N/A | 50 |
| 8 | ALUMINUM PHOSPHATE | ACRYLIC | GLUCONIC ACID | N/A | 100 |
| 9 | ALUMINUM PHOSPHATE | ACRYLIC | GLUCONIC ACID | N/A | 100 |
| 10 | ALUMINUM PHOSPHATE | ACRYLIC | GLUCONIC ACID | N/A | 100 |
| 11 | ALUMINUM PHOSPHATE | ACRYLIC | GLUCONIC ACID | N/A | 100 |
| 12 | ALUMINUM PHOSPHATE | ACRYLIC | GLUCONIC ACID | N/A | 100 |
| 13 | ALUMINUM PHOSPHATE | ACRYLIC | GLUCONIC ACID | N/A | 100 |
| 14 | MAGNESIUM PHOSPHATE | ACRYLIC | GLUCONIC ACID | N/A | 50 |
| 15 | CALCIUM PHOSPHATE | ACRYLIC | GLUCONIC ACID | N/A | 50 |
| 16 | ZINC PHOSPHATE | ACRYLIC | GLUCONIC ACID | N/A | 50 |
| 17 | ALUMINUM PHOSPHATE | ACRYLIC | OXALIC ACID | N/A | 50 |
| 18 | ALUMINUM PHOSPHATE | ACRYLIC | PHOSPHONIC ACID | N/A | 50 |
| 19 | ALUMINUM PHOSPHATE | ACRYLIC | CITRIC ACID | N/A | 50 |
| 20 | ALUMINUM PHOSPHATE | N/A | GLUCONIC ACID | N/A | 50 |
| 21 | ALUMINUM PHOSPHATE | N/A | GLUCONIC ACID | N/A | 100 |
| 22 | ALUMINUM PHOSPHATE | ACRYLIC | GLUCONIC ACID | N/A | 50 |
| 23 | (MAGNESIUM CHROMATE) | ACRYLIC | N/A | N/A | 100 |
| 24 | ALUMINUM PHOSPHATE | N/A | GLUCONIC ACID | N/A | 100 |
| 25 | ALUMINUM PHOSPHATE | N/A | GLUCONIC ACID | N/A | 100 |
| 26 | ALUMINUM PHOSPHATE AND MAGNESIUM PHOSPHATE | N/A | GLUCONIC ACID | FLUOROTITANIC ACID | 100 |
| 27 | ALUMINUM PHOSPHATE AND MAGNESIUM PHOSPHATE | N/A | GLUCONIC ACID | FLUOROTITANIC ACID | 100 |

| | APPLICATION CONDITION | | | BAKING CONDITION | | | |
|---|---|---|---|---|---|---|---|
| SAMPLE No. | METHOD | DIAMETER OF ROLLER (mm) | APPLYING RATE (m/min) | THICKNESS (μm) | FIRST HEATING RATE (° C./sec) | SECOND HEATING RATE (° C./sec) | ACHIEVING TEMPERATURE (° C.) | NOTE |
| 1 | ROLL | 300 | 80 | 1.0 | 12 | 10 | 300 | COMPARATIVE EXAMPLE |
| 2 | ROLL | 300 | 80 | 1.0 | 12 | 10 | 300 | COMPARATIVE EXAMPLE |
| 3 | ROLL | 300 | 80 | 0.5 | 12 | 20 | 300 | COMPARATIVE EXAMPLE |
| A | ROLL | 300 | 80 | 1.0 | 12 | 10 | 300 | COMPARATIVE EXAMPLE |
| 5 | ROLL | 300 | 80 | 0.5 | 12 | 15 | 300 | COMPARATIVE EXAMPLE |
| 6 | ROLL | 300 | 80 | 0.5 | 12 | 10 | 300 | INVENTION EXAMPLE |
| 7 | ROLL | 300 | 80 | 0.5 | 12 | 8 | 300 | INVENTION EXAMPLE |
| 8 | ROLL | 500 | 60 | 0.5 | 12 | 8 | 300 | INVENTION EXAMPLE |
| 9 | ROLL | 700 | 60 | 0.5 | 12 | 20 | 300 | COMPARATIVE EXAMPLE |
| 10 | ROLL | 700 | 45 | 0.5 | 12 | 30 | 300 | COMPARATIVE EXAMPLE |

TABLE 1-continued

| | | | | | | | | |
|---|---|---|---|---|---|---|---|---|
| 11 | ROLL | 300 | 80 | 0.5 | 10 | 6 | 280 | INVENTION EXAMPLE |
| 12 | ROLL | 300 | 80 | 0.5 | 8 | 15 | 250 | COMPARATIVE EXAMPLE |
| 13 | ROLL | 300 | 80 | 0.5 | 12 | 30 | 180 | COMPARATIVE EXAMPLE |
| 14 | ROLL | 300 | 80 | 0.5 | 12 | 10 | 300 | INVENTION EXAMPLE |
| 15 | ROLL | 300 | 80 | 0.5 | 12 | 8 | 300 | INVENTION EXAMPLE |
| 16 | ROLL | 300 | 80 | 0.5 | 12 | 10 | 300 | INVENTION EXAMPLE |
| 17 | ROLL | 300 | 80 | 0.5 | 12 | 10 | 300 | INVENTION EXAMPLE |
| 18 | ROLL | 300 | 80 | 0.5 | 12 | 10 | 300 | INVENTION EXAMPLE |
| 19 | ROLL | 300 | 80 | 0.5 | 12 | 10 | 300 | INVENTION EXAMPLE |
| 20 | ROLL | 300 | 80 | 0.5 | 12 | 8 | 300 | INVENTION EXAMPLE |
| 21 | ROLL | 500 | 60 | 0.5 | 12 | 8 | 300 | INVENTION EXAMPLE |
| 22 | DIP | — | — | 0.5 | 12 | 20 | 300 | COMPARATIVE EXAMPLE |
| 23 | ROLL | 500 | 60 | 0.5 | 12 | 8 | 300 | COMPARATIVE EXAMPLE |
| 24 | ROLL | 300 | 80 | 0.5 | 8 | 8 | 270 | COMPARATIVE EXAMPLE |
| 25 | ROLL | 300 | 80 | 0.5 | 8 | 8 | 300 | COMPARATIVE EXAMPLE |
| 26 | ROLL | 300 | 80 | 0.5 | 8 | 8 | 270 | COMPARATIVE EXAMPLE |
| 27 | ROLL | 300 | 80 | 0.5 | 8 | 8 | 300 | COMPARATIVE EXAMPLE |

*1: COPOLYMER OF FLUOROETHYLENE AND ETHYLENICALLY UNSATURATED COMPOUND

Next, the XPS analysis and evaluation of the rust resistance and the weldability of the insulating film were performed.

In the XPS analysis of the insulating film, Quantera SXM manufactured by ULVAC-PHI, Inc. was used as an analyzer, and mono AlKα ray (hv=1486.6 eV) was used as an X-ray source. The insulating film was etched by the sputtering method using argon ions, and the proportions (atom %) of Fe and P relative to all elements in a circular region having a diameter of 200 μm were measured every time the etching proceeded by about 15 nm. About Fe, the proportion of metal Fe and the proportion of Fe bonded to O were also obtained. The results are listed in Table 2. The underline in Table 2 represents that the numerical value is out of the range of the present invention.

In the evaluation of the rust resistance, a test piece was prepared from each electrical steel sheet, liquid droplets of sodium chloride solutions different in concentration were attached by 0.5 μl to the surface of the test piece and dried, and the test piece was held in an atmosphere with constant temperature and humidity of a temperature of 50° C. and a relative humidity RH of 90% for 48 hours. The concentrations of the sodium chloride solutions were 0.001 mass %, 0.01 mass %, 0.02 mass %, 0.03 mass %, 0.10 mass %, 0.20 mass %, 0.30 mass %, and 1.0 mass %. Thereafter, the presence or absence of rust was observed, and the limit sodium chloride (NaCl) concentration of each test piece was identified. This result is also listed in Table 2.

In the evaluation of the weldability, the welding current was 120 A, a La—W (2.4 mmφ) was used as an electrode, the gap was 1.5 mm, the flow rate of an Ar gas was 6 l/min, and the clamping pressure was 50 kg/cm², welding was performed at various welding speeds. Then, the maximum welding speed at which blow hole was not generated was specified. The result is also listed in Table 2.

TABLE 2

| | INSULATING FILM PARAMETER Q | | | RUST RESISTANCE LIMIT SODIUM CHLORIDE | WELDABILITY MAXIMUM WELDING | |
|---|---|---|---|---|---|---|
| SAMPLE No. | MAXIMUM VALUE | AVERAGE VALUE | MAXIMUM VALUE/ AVERAGE VALUE | CONCENTRATION (mass %) | SPEED (cm/min) | NOTE |
| 1 | 0.78 | 1.10 | <u>1.41</u> | 0.02 | 100 | COMPARATIVE EXAMPLE |
| 2 | 0.70 | 0.95 | <u>1.36</u> | 0.02 | 50 | COMPARATIVE EXAMPLE |
| 3 | 0.80 | 1.20 | <u>1.50</u> | 0.01 | 100 | COMPARATIVE EXAMPLE |
| 4 | 0.74 | 1.05 | <u>1.42</u> | 0.03 | 50 | COMPARATIVE EXAMPLE |
| 5 | 0.6 | 0.88 | <u>1.35</u> | 0.02 | 100 | COMPARATIVE EXAMPLE |

TABLE 2-continued

| | INSULATING FILM PARAMETER Q | | | RUST RESISTANCE LIMIT SODIUM CHLORIDE | WELDABILITY MAXIMUM WELDING | |
|---|---|---|---|---|---|---|
| SAMPLE No. | MAXIMUM VALUE | AVERAGE VALUE | MAXIMUM VALUE/ AVERAGE VALUE | CONCENTRATION (mass %) | SPEED (cm/min) | NOTE |
| 6  | 0.5  | 0.60 | 1.09 | 0.20 | 100 | INVENTION EXAMPLE |
| 7  | 0.50 | 0.55 | 1.10 | 0.30 | 100 | INVENTION EXAMPLE |
| 8  | 0.65 | 0.80 | 1.23 | 0.30 | 100 | INVENTION EXAMPLE |
| 9  | 0.75 | 1.00 | _1.33_ | 0.20 | 100 | COMPARATIVE EXAMPLE |
| 10 | 0.65 | 0.85 | _1.31_ | 0.03 | 100 | COMPARATIVE EXAMPLE |
| 11 | 0.65 | 0.75 | 1.15 | 0.10 | 100 | INVENTION EXAMPLE |
| 12 | 0.70 | 0.92 | _1.31_ | 0.03 | 100 | COMPARATIVE EXAMPLE |
| 13 | 0.75 | 1.05 | _1.40_ | 0.02 | 100 | COMPARATIVE EXAMPLE |
| 14 | 0.50 | 0.58 | 1.16 | 0.20 | 100 | INVENTION EXAMPLE |
| 15 | 0.55 | 0.60 | 1.09 | 0.30 | 100 | INVENTION EXAMPLE |
| 16 | 0.55 | 0.60 | 1.09 | 0.20 | 100 | INVENTION EXAMPLE |
| 17 | 0.58 | 0.70 | 1.21 | 0.20 | 100 | INVENTION EXAMPLE |
| 18 | 0.60 | 0.70 | 1.17 | 0.20 | 100 | INVENTION EXAMPLE |
| 19 | 0.65 | 0.72 | 1.11 | 0.20 | 100 | INVENTION EXAMPLE |
| 20 | 0.50 | 0.55 | 1.10 | 0.20 | 100 | INVENTION EXAMPLE |
| 21 | 0.68 | 0.88 | 1.29 | 0.10 | 100 | INVENTION EXAMPLE |
| 22 | 0.75 | 1.02 | _1.36_ | 0.03 | 100 | COMPARATIVE EXAMPLE |
| 23 | —    | —    | —    | 0.20 | 100 | COMPARATIVE EXAMPLE |
| 24 | 0.68 | 0.92 | _1.35_ | 0.03 | 100 | COMPARATIVE EXAMPLE |
| 25 | 0.63 | 0.87 | _1.38_ | 0.03 | 100 | COMPARATIVE EXAMPLE |
| 26 | 0.70 | 0.92 | _1.31_ | 0.03 | 100 | COMPARATIVE EXAMPLE |
| 27 | 0.64 | 0.87 | _1.36_ | 0.03 | 100 | COMPARATIVE EXAMPLE |

As listed in Table 2, both of a limit sodium chloride concentration of 0.10 mass % or more and a welding speed of 100 cm/min were obtained in Samples No. 6 to No. 8, No. 11, No. 14 to No. 21 within the range of the present invention. In other words, good rust resistance and weldability were obtained.

The limit sodium chloride concentration was 0.03 mass % or less or the welding speed was 50 cm/min in Samples No. 1 to No. 5, No. 9 to No. 10, No. 12 to No. 13, No. 22, No. 24 to No. 27. In other words, the rust resistance or the weldability or both of them were low.

INDUSTRIAL APPLICABILITY

The present invention is applicable, for example, in an industry of manufacturing an electrical steel sheet and an industry using the electrical steel sheet.

The invention claimed is:

1. An electrical steel sheet, comprising:
   a base material of electrical steel; and
   an insulating film formed on a surface of the base material, the insulating film containing a polyvalent metal phosphate and Fe,
   wherein a maximum value of a parameter Q expressed by "$Q = C_{Fe-O}/C_P$" is equal to or less than 1.3 times and equal to or more than 1.09 times an average value of the parameter Q in a region from a first depth from a surface of the insulating film to a second depth, $C_{Fe-O}$ denoting a proportion (atom %) of Fe bonded to O relative to all elements, and $C_P$ denoting a proportion (atom %) of P relative to all elements,
   wherein the first depth is 20 nm from the surface,
   wherein the second depth is a depth where the proportion of P is equal to a proportion of metal Fe,
   wherein the polyvalent metal phosphate is one or more phosphates selected from the group consisting of Al, Zn, Mg, and Ca phosphates, and
   wherein the average value of the parameter Q is 0.4 to 0.8.

2. The electrical steel sheet according to claim 1, wherein the insulating film contains an organic resin.

\* \* \* \* \*